United States Patent [19]

Annevelink

[11] Patent Number: 5,448,727
[45] Date of Patent: Sep. 5, 1995

[54] DOMAIN BASED PARTITIONING AND RECLUSTERING OF RELATIONS IN OBJECT-ORIENTED RELATIONAL DATABASE MANAGEMENT SYSTEMS

[75] Inventor: Jurgen Annevelink, Sunnyvale, Calif.

[73] Assignee: Hewlett-Packard Company, Palo Alto, Calif.

[21] Appl. No.: 693,826

[22] Filed: Apr. 30, 1991

[51] Int. Cl.[6] .............................................. G06F 17/30
[52] U.S. Cl. .................................. 395/600; 364/282.1; 364/283.4; 364/DIG. 1
[58] Field of Search ...................... 364/200, 300, 283.1, 364/283.2, 283.3, 283.4; 395/600, 650

[56] References Cited

U.S. PATENT DOCUMENTS

| | | | |
|---|---|---|---|
| 4,930,071 | 5/1990 | Tou et al. | 395/600 |
| 5,237,678 | 8/1993 | Kuechler et al. | 395/600 |
| 5,241,648 | 8/1993 | Cheng et al. | 395/600 |

OTHER PUBLICATIONS

Won Kim "Object-Oriented Databases: Definition and Research Directions", IEEE Transactions on Knowledge and Data Engineering, vol. 2, No. 3, Sep. 1990.
C. J. Date, *An Introduction to Database Systems*, vol. 1, 1986, pp. 96–101, 147–151, 165–169, 196–199, 241–242, 249–255, 368–370, 221–222.
Elmasri et al., *Fundamentals of Database Systems*, pp. 663–678, 716–725, 1989.
Fishman, D. H., "An Overview of the IRIS Object-Oriented PBMS", COMPCON Spring 1988 IEEE Computer Society International, pp. 177–180, IEEE, 1988.
Kim et al. "Operation and Implementation of Complex Objects", IEEE Trans on Software Engineering, vol. 14, No. 7, pp. 985–996, IEEE, 1988.
Teorey et al. "ER Model as an Aid for User Communication and Documentation in Database Design", Communications of ACM, vol. 32, No. 8, pp. 975–987, ACM, Aug. 1989.
Habbash et al., "Towards an Efficient Management of Objects in a Distributed Environment", IEEE 1990 Symposium on Databases in Parallel and Distributed System, pp. 181–190, IEEE, 1990.

*Primary Examiner*—Thomas G. Black
*Assistant Examiner*—Larry J. Ellcessor

[57] ABSTRACT

A system and method of logically and physically clustering data (tuples) in a database. The database management system of the invention partitions (declusters) a set of relations into smaller so-called local relations and reclusters the local relations into constructs called domains. The domains are self-contained in that a domain contains the information for properly accessing and otherwise manipulating the data it contains. In other words, the data objects stored in the domains may be stored in a particular domain based upon a locality-of-reference algorithm in which a tuple of data is placed in a domain if and only if all objects referenced by the tuple are contained in the domain. On the other hand, the data objects stored in a domain may be clustered so that a tuple of data is placed in a domain based on the domain of the object referenced by a particular element of the tuple. By clustering the related object data in this manner, the database management system may more efficiently cache data to a user application program requesting data related to a particular data object. The system may also more efficiently lock and check-in and check-out data from the database so as to improve concurrency. Moreover, versioning may be more readily supported by copying tuples of a particular domain into a new domain which can then be updated as desired.

24 Claims, 4 Drawing Sheets

DOMAIN BASED PARTITIONING AND RECLUSTERING OF RELATIONS IN OBJECT-ORIENTED RELATIONAL DATABASE MANAGEMENT SYSTEMS

BACKGROUND OF THE INVENTION

1. Field of the Invention

The present invention relates to a technique for logically and physically clustering tuples of data in a relational database by partitioning (declustering) a set of relations into smaller local relations and reclustering the local relations into relational constructs referred to herein as domains. By so clustering the tuples of data into domains including data related to one or more objects, data from the database may be more efficiently cached, locked and copied during access by user application programs.

2. Description of the Prior Art

Before database management systems were developed, user applications programs managed data stored in application-specific files. Because data common to different applications was kept in separate files, data consistency between applications was difficult to ensure. Database management systems were thus developed to simplify the job of developing applications and ensuring data consistency. In particular, database management systems have been used for arbitrating the sharing of files among users, ensuring data integrity and recovery when problems occur, distributing data in a network, managing searches through large amounts of data, and other similar functions. However, since early database management systems were used primarily by transaction-oriented users, such systems were designed to support alphanumeric data formatted into record-oriented files. These early systems were thus limited by the direct-mapping characteristics of record-oriented databases.

However, different users of traditional database management systems have recently developed very different needs for their systems. For example, systems for electronic design automation, engineering information management, engineering test and measurement, telecommunications, office automation and hardware and software design have been developed where it is desired to model the types of information generated by such systems through all phases of product design. Traditional relational database management systems were not well suited to such uses. Computer language primitives, such as a word or symbol, of the data model could be used to represent real-world objects and the relationships among them. In other words, data objects were represented as record types and their attributes given in fields within a record. The relationships were then modeled by placing key values in separate but related data records. These keys could then be used at runtime to join the separate data records so as to recover the object relationships. Thus, rather than seeing the world as composed of records, these "object-oriented" database management systems viewed the world as made up of "objects" i.e. entities defined by their functional characteristics.

Unfortunately, these "object-oriented" database management systems were also limited by their direct mapping of the data objects into particular record types. Tuples, or records, in the relational database model were typically represented as flat collections of fields including, for example, the name of the data object, its value, and its connections. The collection of fields could not handle structured attributes, such as a component hierarchy, when several different types of data objects and interconnections were to be modeled in the database. The problem with such mapping of real-world relationships of data objects into tuples is that the relational model uses a single primitive for handling both an object and its relationship with other objects. This approach has been shown not to work in all cases. Accordingly, such systems have required a set of conventions to be learned by the programmers who use the database. Also, such systems require the data elements to be joined in the program memory to reconstruct the relationships of the data objects. This causes the relational database to slow down such that it is generally too slow for interactive applications.

Object-oriented database management models have been designed to overcome these problems with traditional record-oriented database management systems. The object-oriented model is based on defining and understanding the relationships between objects. In such systems, the objects pass data back and forth, and to define the relationship, the nature of the data, rather than the actual data, is examined to understand how an object uses it. Preferably, such systems maintain the integrity of object relationships declared by the user. A general description of the function of object-oriented databases can be found in an article by Atwood entitled "The Case For Object-Oriented Databases" *IEEE Spectrum*, February, 1991, pp. 44–47. The difference between such an object-oriented database system and a traditional relational database system is depicted in FIG. 1.

As shown in FIG. 1, records 100 are used in a relational database system to define an object in a computer's local memory 102. The separate records 100 typically must be translated and linked (104) with a relational database 106 having records 108 stored therein. By contrast, in an object-oriented database system, the data object relationships of the records 110 are preserved as they appear in local memory 112 so that addresses need only be mechanically adjusted, or swizzled (114), to provide full access to the database representations 116 and 118 in the object-oriented database 120. Object-oriented database systems use swizzling (translation) to reduce the speed penalty associated with direct mapping of main memory pointers to secondary memory pointers in the database. However, such object-oriented databases have not yet become widely accepted.

An object-oriented database management system using beneficial features of both relational and object-oriented database managements systems has recently been disclosed by Wilkinson et al. in an article entitled "The Iris Architecture and Implementation", *IEEE Transactions on Knowledge and Data Engineering*, Vol. 2, No. 1, March 1990, the contents of which are hereby incorporated by reference. As described therein, the Iris system is based on an object and function model where attribute values, relationships and behavior of objects are modeled by functions. In other words, the system architecture efficiently supports the evaluation of functional expressions so that a database management system can be provided which is powerful enough to support the definition of functions and procedures that implement the semantics of the data model. For example, retrievals and updates to the database are written as functional expressions. Users may define new functions which may be implemented as stored tables or derived as computations which may be expressed either as system functional expressions or as functions in a general-purpose programming language such as C. The Iris system allows new operations to be easily prototyped because data model operations can be prototyped as ordinary database functions.

The Iris data model contains three important constructs: objects, types and database functions. Objects in Iris represent entities and concepts input by the user application program. Literal objects such as integers, strings and lists are self-identifying. Surrogate objects, on the other hand, are represented by a system-generated, unique object identifier (OID). Surrogate objects may include system objects such as types and database functions as well as user objects such as individuals and data associated with those individuals. Types have unique names and are used to categorize objects into sets that are capable of participating in a specific set of database functions. The objects are used as arguments to the database functions and may be returned as the results of such database functions.

In Iris, attributes of objects, relationships among objects, and computations on objects may be expressed in terms of database functions. Iris database functions are defined for different types and may have many values. A function is compiled into an interpretable runtree which may be recursive. A type can be characterized by the collection of functions defined on it. In Iris, a new function is declared by specifying its name, the types of its argument and result parameters and, optionally, names for the arguments and results. Generally, the properties of objects are modified in the Iris system by changing the values of functions. Functions with values stored as tables can always be updated. However, functions whose values are computed may or may not be updatable. More details regarding the declaration and implementation of such functions can be found in the aforementioned article by Wilkinson et al.

The Iris database management system is unique in that although it is object-oriented, the database is driven by an extended relational database engine as shown in FIG. 2. In other words, all object-oriented inquiries to Iris are changed to relational constructs and stored as tables. For example, the relational operators such as the trees describing the relationships between the data objects are converted to relational commands so that the operator of Iris need only call a function to perform the desired manipulation of the data object. These functions may be mapped to a table in the relational database. FIG. 2 illustrates the kernel architecture for an Iris system which provides for implementation of such functions.

As shown in FIG. 2, the Iris kernel is organized as a collection of modules which are accessed by the user through a client application program 200. The top-level module, the Executive 202 (EX), implements the kernel entry points and manages the client-kernel interaction. For each request, the Executive 202 calls the Query Translator 204 (QT) to produce a relational algebra tree for the request. The Executive 202 then passes this tree to the Query Interpreter 206 (QI) which produces the resultant expression. The Object Manager 208 (OM) is a set of system procedures and functions which are implemented as separate functions written in some general-purpose programming language and compiled outside of Iris. On the other hand, the Cache Manager 210 (CM) is an intermediate layer between the Iris kernel and the Storage Manager 212 (SM) of the database. Cache Manager 210 provides prefetching and cache management for data retrieval and data updates between the kernel and the Storage Manager 212 of the database. The Storage Manager 212 provides data sharing, transaction management and access to stored tables.

A copy of the Iris kernel is provided to each user accessing the database. The kernel may execute as a server in a separate process and communicate with the user's application programs via messages. On the other hand, the user and the kernel may be tightly coupled in the same process and communicate via subroutine calls. In either case, the configuration is transparent to the source code of the user. Storage Manager 212 always executes in the same address space as the kernel, while multiple instances of the Storage Manager 212 use a shared memory buffer for caching data, concurrency control and transaction logging. More details regarding the other elements of the Iris kernel can be found in the aforementioned article by Wilkinson et al.

As noted above, one feature of the Iris system is that it caches data between the Iris kernel and Storage Manager 212 using Cache Manager 210. Cache Manager 210 caches tables, not functions, and maintains a tuple cache which may cache tuples from individual tables. A table of the database may have at most one tuple cache, where the tuple cache is accessed via a column of the table and that column is either uniquely-valued or many-valued. If a column is many-valued, the tuple cache ensures that whenever a given value of that column occurs in the cache all tuples of the table with the same column value will also occur in the cache. This guarantees that when a cache hit on a many-valued column occurs, the scan can be entirely satisfied from the cache without having to invoke the Storage Manager 212 to keep information in the cache consistent therewith.

The performance of the Iris system is very dependent on its cache. Unfortunately, in the Iris system the input tuples are assigned to tables which are randomly assigned to pages. Accordingly, data clustering of the tuples of data onto the same page cannot be controlled. Efficient caching is thus not possible. The retrieval performance from the cache could be significantly improved if Iris cached function values rather than tables since a function call could be directly evaluated without compiling it into a relational algebra tree. However, updates to stored tables pose a challenge since a single tuple of data in a stored table may contain values from many functions, such as when functions are horizontally clustered together in one table. Thus, the individual function caches would need to be located and updated in an efficient manner. For example, since certain system functions are frequently accessed together, most of the functions for a particular type of object may be horizontally clustered on the same table and the table cached when a user application program requests the stored functions.

Generally, database systems provide caching to allow user application programs to access data without having to access secondary storage. However, with the advent of distributed (client-server based) systems, the problems associated with caching data have compounded in that, for performance reasons, it is desirable that users keep their own data cache. Such caches need to be synchronized with the data in the underlying database, which generally requires the use of locking strategies to allow users to update their caches when appropriate. Prior attempts to solve such problems have been based largely on associating locks with physical storage constructs. Particularly, in the case of relational database systems, locks have been associated with tables which store the extent of a relation, with pages in a table, or with individual tuples in a table. However, each of these approaches has problems in that the granularity of the lock is either too high or too low or it is difficult to know the extent of the data that is actually locked. Also, locks are typically transparent to a user application program, making it difficult to control the locks. Accordingly, it is desirable to develop a caching system for object-oriented data in the database such that the data can be cached efficiently without excess data locks and with the desired granularity of the lock.

It is further desirable that a database caching system be developed which prevents deadlock. Deadlock occurs when a user application program needs to access data that is locked by another user application program. When deadlocked, the transactions must be aborted and restarted. Typical distributed applications in the area of engineering information management and discrete manufacturing and the like interact with components that are not under control of a transaction manager (e.g., a user editing a diagram), making it difficult to restart transactions. This poses an important problem with regard to granularity of locks, i.e., the unit of data that is to be locked. In particular, if the granularity is too high, concurrent access is reduced and the probability that a transaction is aborted increases because of the higher probability of conflicting locks. On the other hand, when the granularity is too low, the overhead of locking becomes prohibitive. In addition, such applications typically require long transactions, something for which a typical transaction manager is not very well suited. Moreover, the capability of restarting a transaction depends on being able to capture all the side-effects a transaction can have, which becomes increasingly difficult if the transactions are of longer duration and/or involve interaction with parts of the system not under control of the transaction manager.

Accordingly, it is desired to develop a technique whereby caching in prior art database management systems may be improved so as to increase concurrency. It is also desirable that functions be applied to cached data such that, for example, a whole relational tree of tuples can be copied. In general, it is desired that a system be developed whereby database information may be clustered to optimize common access patterns so as to improve database performance. However, since clustering in relational database systems is typically done on a per relation basis, clustering of data has not been possible since the different relations are stored in different tables. This problem should also be overcome so that related data may be clustered and used by the user application program. Moreover, it is also preferred that such a technique be extended to allow versioning, which is control over multiple versions of product design data, and to provide configuration control, which is the management of the resources so that any version of the data can be recalled when needed. Preferably, a technique can also be developed for providing configuration management for versioning sets of objects. The present invention has been designed to meet these needs.

SUMMARY OF THE INVENTION

The present invention meets the above-mentioned needs in the art by defining a new technique for logically and physically clustering tuples of data in a database. The technique of the invention is based on the partioning (declustering) of a set of relations into smaller so-called local relations and reclustering the local relations into constructs referred to herein as domains. A domain as defined herein is self-contained, i.e., a domain contains the information for properly accessing and otherwise manipulating the data it contains. This is achieved by properly annotating and declustering the system data. Domains thus provide a way of partioning a database into a number of disjoint datasets so as to allow the efficient transfer of parts of the database across process and machine boundaries. Also, the invention provides a method of caching both access to and updates of the data stored in the database in a user application program without requiring the user to immediately propagate updates to the server.

Preferably, the domains described herein are of two types. Physical domains are storage structures that contain the relationships between the data objects contained in the domain as well as part of the object directory defining the data objects contained in the domain. The storage structure preferably takes the form of a collection of tables. Thus, physical domains actually contain objects and their associated data in the form of local tables. Logical domains are, on the, other hand, are groups or collections of physical and logical domains which are grouped together in order to allow operations to apply to a group of domains rather than a single domain.

By clustering tuples of data into domains, novel and efficient ways of caching, locking, copying and checking in and out the stored data may be made possible in accordance with the present invention. Versioning strategies may also be defined based on the capability of the system to efficiently copy sets of objects and their state. Also, to give a user application program more control over the extent of its queries, a select operator in the underlying relational calculus may be extended to include the specification of a logical domain and change its implementation so that it iterates only over the local tables (corresponding to the relation that the select is applied to) associated with the domains included in the logical domain specified with the select.

The present invention thus relates to an object-oriented database management system for storing and manipulating data objects having object identities. Such a database management system in accordance with the invention includes the concept of a domain and preferably comprises means for defining and manipulating tuples of data representing relationships of the data objects, a relational database having storage tables therein for storing the tuples, and storage management means. Preferably, the storage management means partitions the storage tables, in accordance with relationships between the data objects, into a plurality of local tables and clusters the local tables into respective storage clusters called domains, where each domain comprises a collection of data objects and their relationships to other data objects in the relational database. In a preferred embodiment, the means for defining and manipulating tuples comprises a user system having means for processing a user application program and a cache memory accessible by the user application program via the storage management means. In such an embodiment, the storage management means preferably caches tuples of a domain into the cache memory for controlling access by the user application program. Since all tuples desired by the user application program are generally in the same domain, caching efficiency can be improved and granularity optimized.

Various techniques may be used to control the declustering of the relational database into domains in accordance with the invention. In the locality of reference technique, the relational database stores an input tuple in a local table corresponding to a domain in which all data objects referenced by data within the input tuple are contained. In another technique, however, the relational database stores an input tuple in a local table corresponding to a domain of a data object referenced by a particular data element of the input tuple. In either technique, the storage tables may be further partitioned into a global table which either stores relationships between data objects in different domains or which stores tuples not contained in the local tables.

In accordance with the invention, several storage constructs may be used to implement the domains. For example, a row of a local table may store a tuple, where each tuple comprises an ordered list of values including an object identity of a data object. So that the domains may be manipulated, the storage management means also assigns object identities to the domains. A plurality of the domains can thus be clustered in accordance with their domain object identities. Preferably, data objects are given unique object identities (OIDs) determined by combining the object's OID with the OID of the domain itself (since the domain is also an object). In this manner, all objects may have unique OIDs in the global domain. Also, to further enhance manipulation, the storage management means may also define a logical domain which corresponds to a plurality of the domains by specifying the OID of the logical domain, the name of the logical domain and a set of domains to be contained in the logical domain.

The scope of the invention may also include a method of partitioning data stored in a relational database in accordance with relationships between data objects having object identities and of clustering the partitioned data into storage clusters called domains which allow tuples of application defined data stored therein to be manipulated by an application program via a database interface. Such a method in accordance with the invention preferably comprises the steps of:

storing tuples of data representing relationships of the data objects in at least one storage table of the relational database;

partitioning the storage table into a plurality of local tables, each local table being associated with a domain comprising a collection of data objects and their relationships to other data objects in the relational database; and clustering the local tables within the relational database into the domains.

The scope of the invention also includes a method of manipulating data which is part of and represents related data objects stored in a relational database. Such a method in accordance with the invention preferably comprises the steps of:

storing tuples of data representing relationships of the data objects in a storage table of the relational database;

partitioning the storage table into a plurality of local tables, each local table being associated with a domain comprising a collection of data objects and their relationships to other data objects in the relational database;

clustering the local tables within the relational database into respective domains;

retrieving tuples from selected ones of the respective domains; and manipulating the retrieved tuples by applying object management operations to data objects within the selected domains.

In accordance with a preferred method, the retrieving step comprises the step of caching tuples in a selected domain into a cache memory accessible by a user application program via the database interface. The retrieving step may also comprise the further step of controlling access to the tuples by the user application program on a per domain basis. The preferred method of the invention may also comprise the further steps of assigning object identities to the domains and assigning data objects domain object identities determined by combining the object's OID within a first domain with the OID of the first domain. In such an embodiment, the manipulating step preferably comprises the steps of copying all tuples in the first domain to local tables of a second domain, assigning an object identity to the second domain and assigning data objects within the second domain new OIDs determined by combining the object's OID within the first domain with the OID of the second domain. Such manipulation allows versioning in accordance with the techniques of the invention. Those skilled in the art will appreciate that other functions may be applied to the domains in accordance with known database manipulation techniques.

BRIEF DESCRIPTION OF THE DRAWINGS

These and other objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENTLY PREFERRED EMBODIMENT

Figure 1:
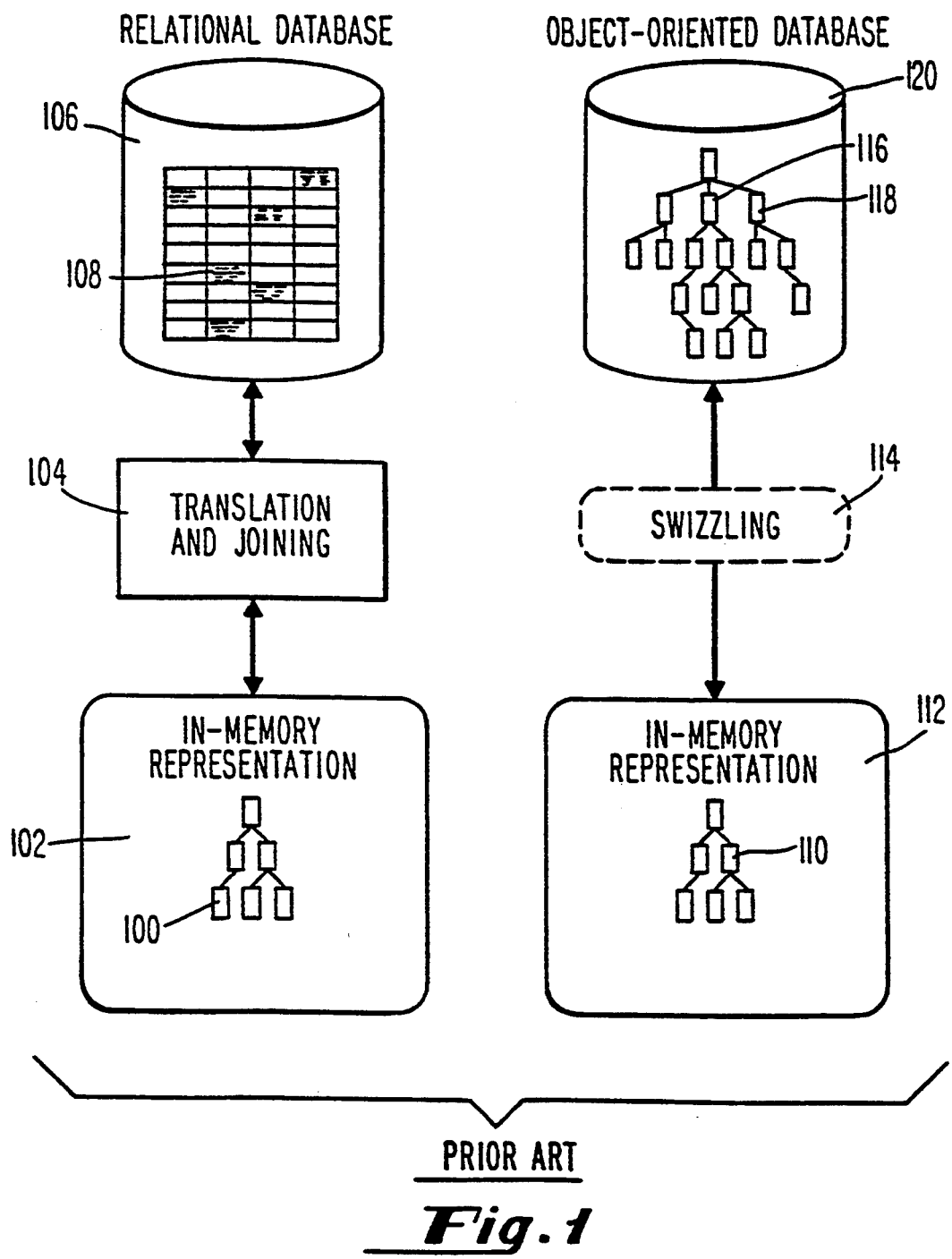
FIG. 1 illustrates a comparison of a relational database and an object-oriented database of the prior art.
Figure 2:
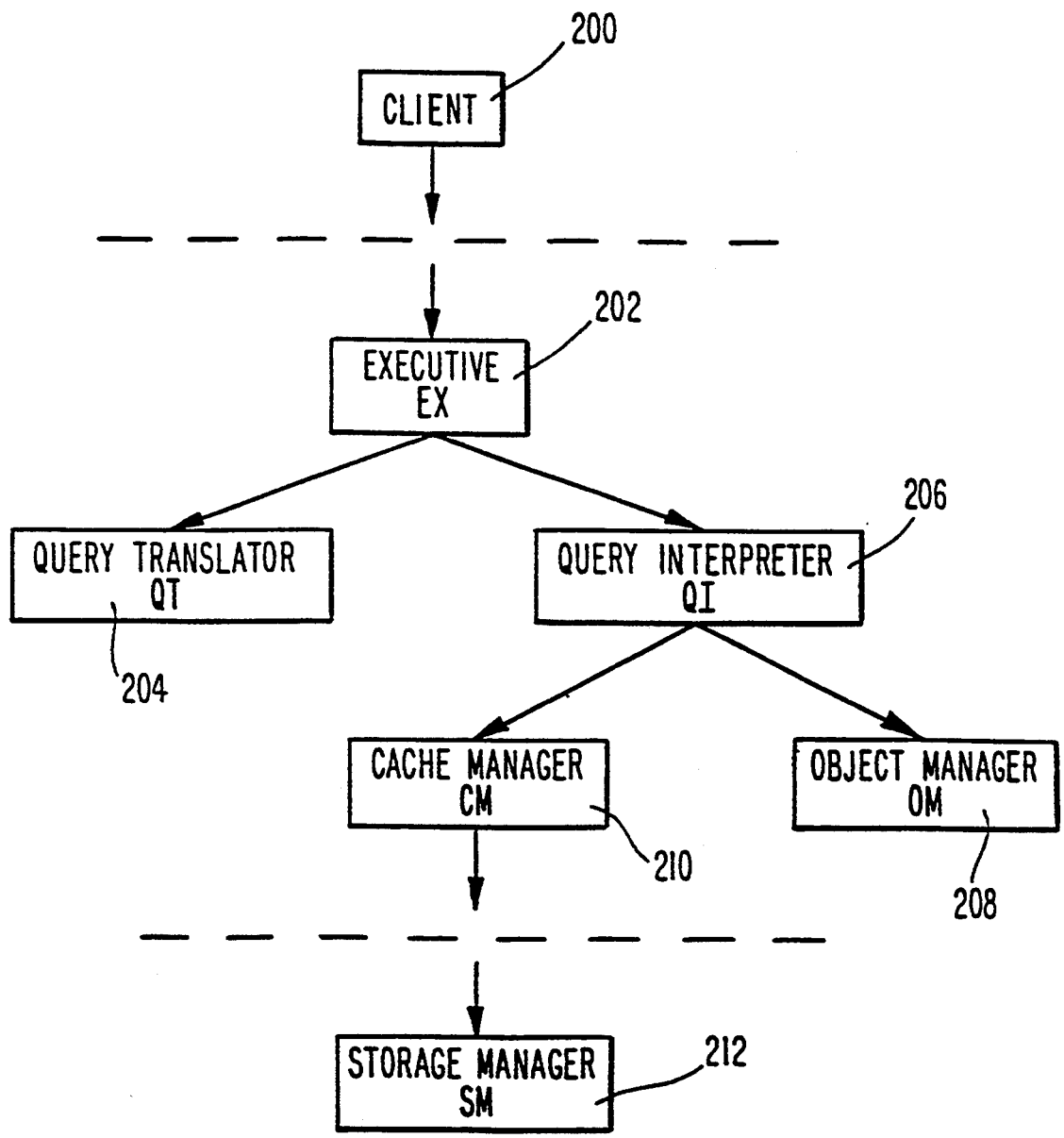
FIG. 2 schematically illustrates the kernel of the Iris object-oriented relational database system.

A system and method which afford the above-mentioned and other beneficial features in accordance with the presently preferred exemplary embodiment of the invention will be described below with reference to FIGS. 3–6. Those skilled in the art will readily appreciate that the description given herein with respect to those figures is for explanatory purposes only and is not intended in any way to limit the scope of the invention.

Accordingly, all questions regarding the scope of the invention should be resolved by referring to the appended claims.

As will be described below, the present invention relates to a system and method for partitioning and clustering the tuples of data in a collection of tables based on the domains that the argument and result objects identified by respective object identities (OIDs) belong to. The new clustering method of the invention allows novel and efficient ways of caching, locking, copying and checking in and out the stored data to be defined. A preferred embodiment of the invention will be described in the context of the above-mentioned object-oriented relational Iris database, and accordingly, terminology adapted from the Iris data model will be used herein. However, as will be appreciated by those of ordinary skill in the art, the present invention can be more generally applied to any relational database system provided that the relational database system includes the notion of object identities (OIDs) or a unique data key.

In the Iris system, data is stored in homogenous tables whose columns can be mapped to the arguments and results of the so-called stored functions. As noted by Wilkinson et al. in the afore-mentioned article, an Iris stored function is similar to a relation in a conventional relational database management system, and accordingly, the present invention works equally well for any relational database system that includes the notion of an object identifier. The arguments and results of the Iris stored functions (or relations) are typed, thereby limiting the values of the arguments and results to either atomic literal values such as integers and strings or non-literal object identities (OIDs). A combination of argument and result values may be stored as a tuple (row) of the table implementing the stored function. The present invention extends upon such concepts used in the Iris system by incorporating the concepts of domains and domain objects.

Logically, a domain defines a named collection of objects, where each object is contained in exactly one domain. A data object as used herein refers to a pair consisting of an object identity (OID) and a state consisting of a set of tuples, where every tuple is an ordered list of values including the OID of the object. In the Iris database system, the state tuples correspond to argument result pairs of stored functions, i.e., those functions that are mapped directly into underlying relational tables. These definitions may be illustrated by a simple example. If a type Person is created with three stored functions, namely, FirstName, LastName and Children, as follows:

create type Person properties (FirstName Charstring, LastName Charstring);

create Function Children (Person p)→Person as stored;

then the state of a specific Person object with object identity $id_1$, could then consist of the following sets of tuples:

<$id_1$, "John">
<$id_1$, "John's_Lastname">
<$id_1$, id_of_child_of_John$_1$>
<$id_1$, id_of_child_of_John$_2$>

In the present invention, as in Iris, the tuples are preferably stored into tables managed by a relational storage subsystem. The precise mapping of functions to tables depends on how the functions are implemented. In the above example, two tables would be used, one containing the tuples that are part of the extent of the functions FirstName and LastName and one containing the tuples that are part of the extent of the function Children. The reason for this will be more apparent from the following description.

In general, a tuple that is part of the state of an object may contain the OIDs of other objects. It is thus difficult to determine which object State the tuple is part of. This may be made explicit by indirectly marking a certain element of the tuple, such as by optionally tagging a single argument or result of a function with a new flag. This approach is used in Iris and allows its storage manager to deduce that tuples that are part of the extent of the function identified by the flag are part of the state of the object whose OID matches the element identified by the flag.

When an object is created in accordance with the present invention, the user application program that creates the object specific the domain the object is to be contained in, if any. Typically, related objects are stored in the same domain. However, the most important criteria to determine the domain of an object will be to balance increased granularity, which will reduce the amount of concurrent access by increasing the granularity of locks, with minimizing the number of relationships between objects in different domains.

Physically, a domain is a storage structure that contains the relationships between the objects contained in the domain, as well as part of the object directory defining the objects contained in the domain. This storage structure takes the form of a collection of tables. Conceptually, in accordance with the invention there is still a single table corresponding to the stored function, but in the actual implementation, this table is horizontally partitioned, resulting in a set of local tables, each of which is associated with a particular domain. Relationships involving objects contained in different domains are stored in a so-called global domain, which may also contain the objects not otherwise contained in a particular domain. All objects that are not explicitly contained in a physical domain are contained in the global domain, which is a pre-defined system object. Objects that are not related to objects outside the domain they are contained in will be called local objects herein, while all other objects will be called global objects herein. Also, tables associated with the global domain will be referred to herein as global tables, while the tables associated with other domains will be referred to herein as local tables.

Figure 3:
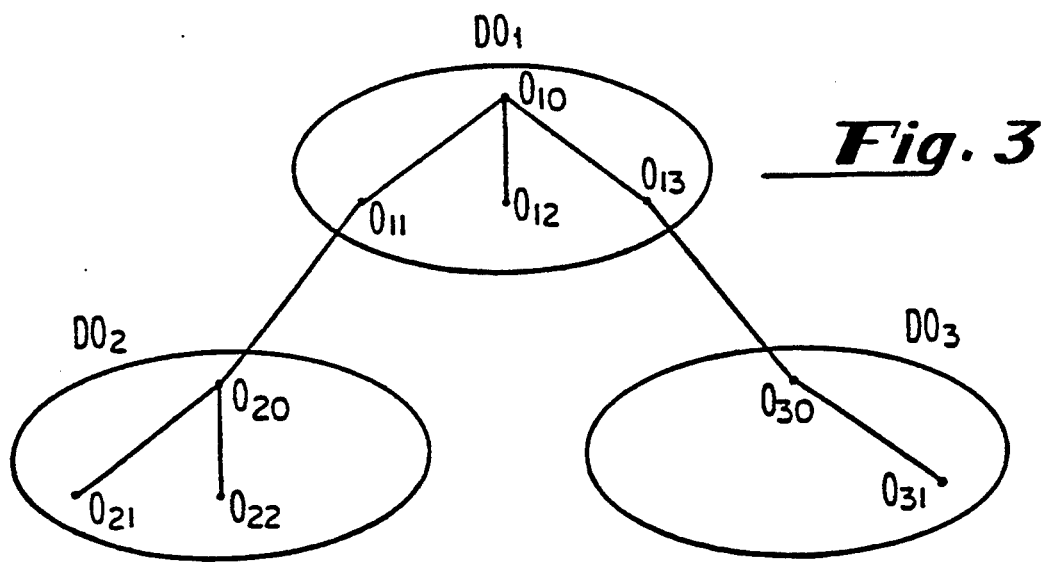
FIG. 3 conceptually illustrates domain objects (DO) and the data objects (O) stored therein in accordance with the techniques of the invention.

A simple example of declustering a stored relation into a number of local tables of a domain and a global table of a global domain as defined herein is shown in FIG. 3. FIG. 3 illustrates three domain objects $DO_1$, $DO_2$ and $DO_3$. In FIG. 3, the objects labeled $O_{11}$, $O_{20}$, $O_{13}$ and $O_{30}$ are global objects in that they have relationships with objects outside their own domain, while all other objects illustrated in FIG. 3 are local objects which are local to the domain in which they are contained. As will be described in more detail below, all objects (global and local) have unique OIDs which distinguish them from all other objects in their domain and in the global domain.

If each of the local and global objects illustrated in FIG. 3 has a NAME function (stored as a relation), which is defined as a character string, and a MANAGES function (also stored as a relation), which returns a set of managed objects, then the local and global tables for these functions for the database depicted in FIG. 3 may be as shown in Tables 1 and 2 below. In other words, as shown, in a database storing data relating to particular individuals, each of the domain objects may refer to a particular individual. Those individuals having certain common relationships may be declustered according to the clustering scheme (where a cluster column is the argument of the NAME function) and placed in the same domain. The MANAGES function, on the other hand, may be declustered according to the locality of reference scheme as indicated.

TABLE 1

NAME FUNCTION:GLOBAL AND LOCAL TABLES

| GLOBAL DOMAIN TABLE | LOCAL DOMAIN TABLES | | | | | |
|---|---|---|---|---|---|---|
| | $DO_1$ | | $DO_2$ | | $DO_3$ | |
| $O_{10}$ | "Dan" | $O_{20}$ | "Ming" | $O_{30}$ | "Jim" | |
| $O_{11}$ | "Marie" | $O_{21}$ | "Rafi" | $O_{31}$ | "Jeff" | |
| $O_{12}$ | "Jussi" | $O_{22}$ | "Bill" | | | |
| $O_{13}$ | "Nancy" | | | | | |

TABLE 2

MANAGES FUNCTION:GLOBAL AND LOCAL TABLES

| GLOBAL TABLE | | LOCAL TABLES | | | | | |
|---|---|---|---|---|---|---|---|
| | | $DO_1$ | | $DO_2$ | | $DO_3$ | |
| $O_{11}$ | $O_{20}$ | $O_{10}$ | $O_{11}$ | $O_{20}$ | $O_{21}$ | $O_{30}$ | $O_{31}$ |
| $O_{13}$ | $O_{30}$ | $O_{10}$ | $O_{12}$ | $O_{20}$ | $O_{22}$ | | |
| | | $O_{10}$ | $O_{13}$ | | | | |

As shown in Table 1, the example of FIG. 3 has no global domain objects for the NAME function. However, as shown in Table 2, the global table of the MANAGES function stores the relationships between objects in different domains. Objects in the same domain are stored only in the local tables.

Domains may be implemented in a preferred embodiment by extending the Iris system to include a new system type called domain, which is preferably an immediate sub-type of object. A number of new system functions may also be defined as necessary to keep track of the various properties of domains. In particular, physical domains are defined by specifying the domain OID, a string identifying the name of the domain and the set of data objects to be contained in the domain. User application programs can thus create a domain as an object as well as the objects contained in the domain. For example, the Iris system can be extended to create new object identities (OIDs) using the name or OID of the domain as an argument. In other words, a domain itself may be defined as a data object by using the name or OID of the domain as an argument when creating new object identities. Generally, the domain OIDs are stored in the global table. One skilled in the art will appreciate that the system functions of the Iris system will be extended to take the domain that the object is to be created in as an additional parameter. Other modifications will be apparent to those of ordinary skill in the art.

As noted above, the physical implementation of domains requires that a storage structure be defined to store the relationships between the objects contained in the domain. In accordance with a preferred embodiment of the invention, these relationships are stored using tables, similar to what is done by the current implementation of Iris as described by Wilkinson, et al. in the aforementioned article. However, one skilled in the art will appreciate that the Iris system has only one domain, the global domain, and that the domain is implicit in all operations. Hence, a function may be defined which returns for a given domain D and table grid in the global domain the OID of the corresponding local table in the domain D and hence the OID of the domain itself. As noted above, objects within a domain are identified by an OID. However, a unique OID for an object for all domains may be found by combining (e.g., logical ORing together) the object's OID within the domain with the OID of the domain itself (as illustrated in table 504 of FIG. 5). The local domain table is similar to (i.e., it has the same number of columns as) the global table, but instead of storing the domain OID as well as the object's OID, it will store only the object's OID. Other functions may be defined in Iris which return values used to keep track of the allocation of OIDs within the domain. For example, an offset value may be used as a guess as to what is the next available OID in the domain. The offset may be simply incremented modulo the maximum number of objects per domain each time a new object is created. In addition, a count value may be used to keep track of the total number of objects in the domain, where the total number of objects in the domain is limited by an implementation dependent parameter. As will be apparent to those skilled in the art, OIDs enable efficient copying of the domains and save storage space.

In accordance with the invention, numerous operations may be performed on domains, such as check out/check in, copy, create, delete, copy object and move object. In other words, the domains may be used by the database management system of the invention as a unit of operation for performing operations such as caching, which allows the data contained in the domain to be cached in main memory, either on the client or server side of a user application program, controlling access by a user application program to the data in a domain, and copying, based on the storage structures chosen implementing domains, all the data objects belonging to a domain. Several of such domain operations will now be described.

As part of beginning a transaction, a user application program can check out one or more domains in either the read or write mode by specifying the domain as the requested object. Typically, as known to those skilled in the art, a domain checked out from a database in a read mode cannot be updated, but other user application programs may or may not modify or otherwise update the objects contained in the domain in the database. On the other hand, a domain checked out from a database in a write mode can be updated but other user application programs are prohibited from accessing the objects in the domain. Domains are checked out from the database so that different user application programs do not fight for access to the same data. In accordance with the invention, domains remain checked out across transactions unless explicitly checked in, or the session of which the transaction is part is terminated. This way, cached data need not be invalidated if a database transaction is committed or rolled back. Also, this allows domains to implement their own locking mechanism (such as table locks) by updating the read and write data locking functions. The reason for allowing check in and check out only at the end and beginning of a transaction, respectively, is that only in this way can one guarantee that the storage manager of the database system keeps locks on the tables implementing the read and write functions for a short amount of time. Moreover, because user application programs control what objects are to be part of a domain, using domains as the basis for a checkin/checkout mechanism provides a semantic integrity in terms of locking data needed by user application programs that is lacking from other storage constructs such as tables, pages or tuples.

Preferably, the check in and check out operations are followed immediately by a transaction commit operation, which releases all data locks. However, cached data coming from local tables that belong to one of the domains that is checked out need not be uncached, because no other application is allowed to update the data which has been checked out. In addition, since the granting of read and write locks is controlled by the process implementing the domain, there is only one user application program that can accumulate write locks on a particular local table at any one time. This way, the possibility of user application programs acquiring locks needed by other applications, possibly resulting in deadlock, is greatly reduced. However, unless further precautions are taken, there is still the possibility that user application programs will lock each other out of access to data when updating the global tables in the global domain.

In a preferred embodiment of the invention, two different copy operations can be applied to a domain so as to allow versioning of data objects. The first copy operation creates another domain that cannot be distinguished from the original domain except that the data objects contained in the copied domain have no relationships with objects outside of their domain. On the other hand, the second copy operation creates a domain that cannot be distinguished from the original at all in that it also copies all relationships that data objects have with objects outside of their domain. Copying a domain can be done very efficiently because a domain does not contain its own OID, for, as noted above, all objects in a domain are simply referenced by their OID within the domain. Therefore, the first copy operation can be implemented by creating a new domain object with a new domain OID, copying the objects in the local tables of the original domain to the new domain, creating new objects in the new domain, copying the state of these objects and replacing the OIDs of the objects in the original domain by the corresponding OIDs in the new domain. The second copy operation is slightly more complicated in that the external relationships of the objects contained in the domain must also be copied to the new domain. This is done by selecting and copying the appropriate tuples from the tables belonging to the global domain. A similar process is followed when deleting a domain.

A simple yet powerful versioning mechanism may be defined in accordance with the present invention by defining the versioning operations on domains rather than the objects contained in them. For example, a domain containing the state of a collection of base parts required for assembling a certain composite part may be defined. Then, if the design of the composite part changes, requiring changes in the set of base parts from which it is constructed, by assuming that the composite part as well as the objects representing the inclusion of a base part into the composite part are part of the same domain, a version of the composite part may be created as a version of the domain. Creating a version of a domain amounts to simply copying the domain, followed by an operation that installs the new domain as the successor version of the original domain. As with the checkin/checkout mechanism, using domains for versioning has the advantage that user application programs can control what objects are to be part of a domain.

To create an object in a specified domain on an Iris system modified in accordance with the invention, it is generally enough to specify the domain and the type of the object (e.g., a person). As noted above, the OIDs of the data objects stored in a particular domain are generated based on the OID of the data object within the domain as well as the OID of the domain itself. Aside from the inclusion of the domain OID, this is not different from how data objects are created in the afore-mentioned Iris system. Deleting an object or adding a type to an object may also be accomplished as in the aforementioned Iris system. However, to copy an object, a new object must be created and all relationships that the object participates in copied to the new object. Moving an object from one domain to another is complicated by the fact that the OID of an object depends on the domain it is contained in. As a result, moving an object preferably consists of the two steps of copying the existing object into the desired domain and deleting the original object.

The implementation of domains in accordance with a preferred embodiment of the invention will now be described with respect to FIG. 4.

Figure 4:
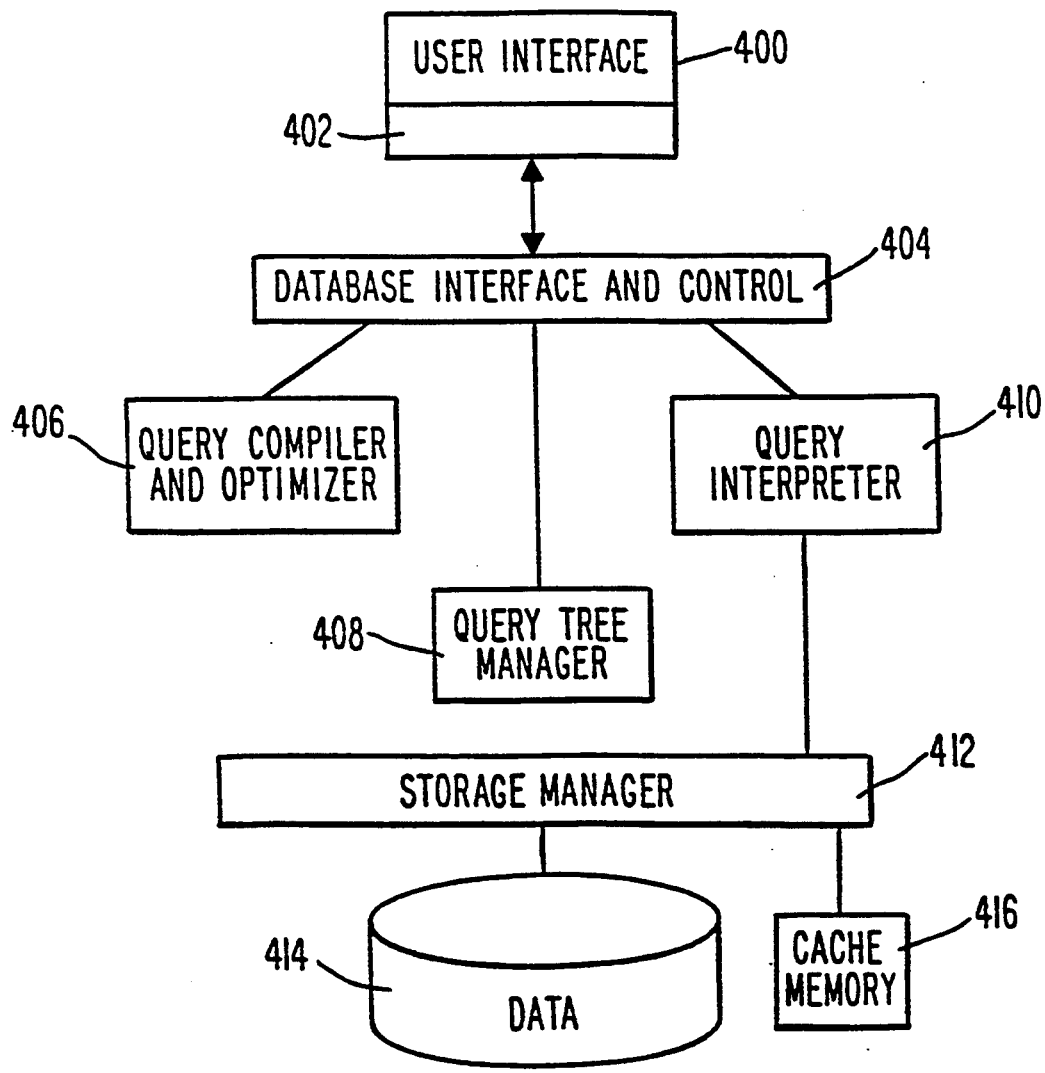
FIG. 4 schematically illustrates a database management system which incorporates domains in accordance with the invention.

FIG. 4 illustrates a simplified block diagram of a database management system in accordance with the invention. FIG. 4 illustrates the best of the high-level structure of both relational database systems and object-oriented database systems. As shown, a user interface 400 is provided for interfacing user application programs 402 which request tuples of data to a database interface and control block 404 which, in turn, provides a programmatic interface between the database server and other components. Database interface and control block 404 also implements overall control flow by calling the other blocks shown in FIG. 4. Such blocks include a Query compiler and Optimizer block 406 which compiles a query tree (parsed database request) into a runtree that can be interpreted directly by the Query Interpreter block 410. The Query Tree Manager block 408 allows query trees and query runtrees to be stored in and retrieved from the database. Query Interpreter block 410, on the other hand, evaluates query runtrees in a manner known to those skilled in the art. Storage Manager 412 receives requests to retrieve or update tuples from tables stored in the Database 414. In a preferred embodiment of the invention, the Storage Manager 412 is a relational Storage Manager that implements tables and operations on tables (local tables corresponding to domains) of the type described herein. Finally, a cache memory 416 is provided for storing, under control of the Storage Manager 412, cached data requested by the user application program 402 during an access to the database 414.

To implement the concept of domains as herein described, Storage Manager 412 partitions the tables of Database 414 based upon the domains of the objects stored in the tables. To allow a table to be partitioned, it will be assumed that one of the columns of the table has been marked as the partitioning column. Typically, this column will contain OIDs. The table is then partitioned into a global table and a number of local tables according to the domain of the objects in the partitioning column. Tuples belonging to objects in the global domain become part of the global table, while tuples belonging to objects in particular domains become part of the corresponding local tables. As a result of this partitioning process, a single table will be split into a global table and a varying number of local tables, where each of the local tables is associated with a specific domain, i.e., the domain that the objects in the partitioning column belong to. For implementation reasons, the OID of the global table is assumed to be the same as the OID of the original unpartitioned table of the Database 414. However, the local tables will be given their own OID, such that each domain may also be treated as an object by the user application program 402.

As previously noted, since data is accessed on a domain basis, the data is also cached on a domain basis. If domains are properly defined, this approach should provide optimum caching granularity. Thus, during operation, the system of FIG. 4 accesses the data in Database 414 on a domain basis in response to a data request in the user application program 402. Tuples of data stored in the Database 414 are clustered into domains which are identified as parameters in the user application program for specifying the domain containing the tuples of data needed by the user application program.

Figure 5:
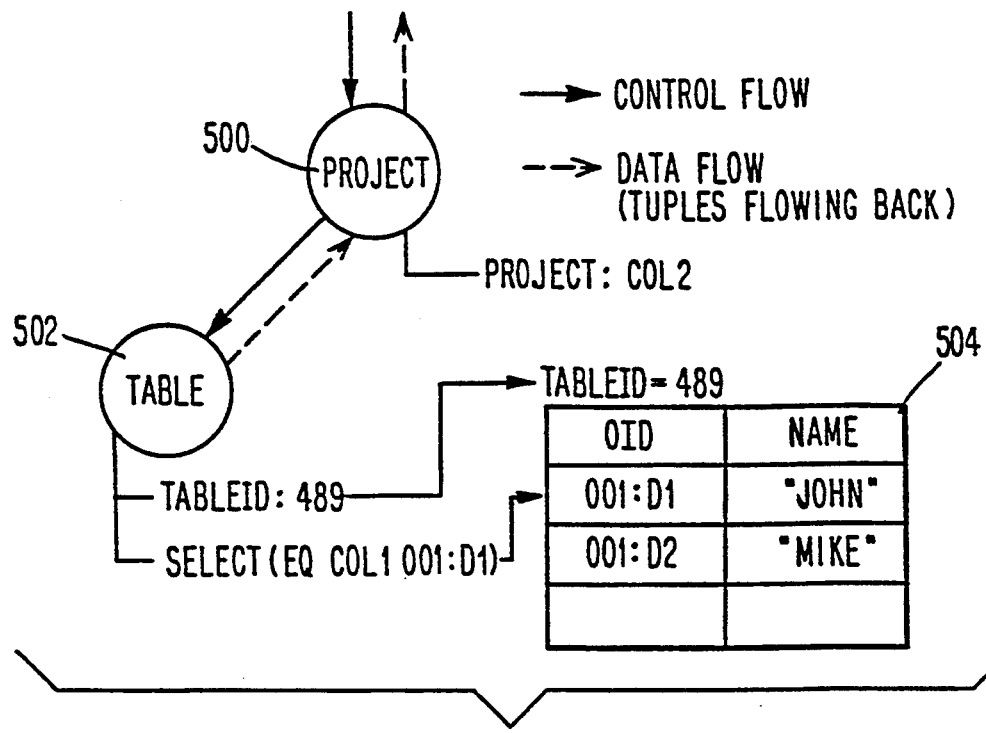
FIG. 5 illustrates how domain data is accessed using a select operator in accordance with the invention.

The process of accessing data in Database 414 in accordance with the invention will now be described with respect to FIG. 5.

When a user application program 402 requests data in a particular domain from Database 414, the Query Interpreter 410 evaluates the runtree of the query from the user application program 402 and provides an interface to the Storage Manager 412. To interface with such a table oriented Storage Manager 412, the Query Interpreter 410 is typically based on a stream oriented model of interpreting the relational query operators. In a preferred embodiment, the relational query operators include select, project and join. For example, a simple query to retrieve the name of a person from Database 414, given the social security number of the person, can be represented as shown in FIG. 5. In particular, FIG. 5 illustrates a simple tree consisting of two operator nodes, namely, a PROJECT node 500 and a TABLE node 502. The TABLE node selects all tuples that satisfy the select expression, where the select expression may be used to compare the values within a table and to qualify tuples for return to the requesting user application program. In the example shown, the select expression selects all tuples in which the first column of the table is equal to "001:D1". As shown, the table has two entries with an object OID of "001". However, the different objects are distinguished by specifying which domain (D1 or D2) the person is in. The TABLE node 502 abstracts the interface to the Storage Manager 412 and contains at least the TableId (489) and optionally a boolean expression for selecting one or more tuples from the table 504 (having TableId 489). By default, the select expression is true, thus allowing the TABLE node 502 to return all tuples found in the table 504 to PROJECT node 500. TABLE nodes 502 are always found at the leaves of the tree, for they generate the tuple streams that are operated upon by the other nodes. Thus, FIG. 5 illustrates that a node may be used to select a local table corresponding to the requested domain, while a select expression may be used to select a particular column or tuple from the selected table in accordance with the OID of the requested object.

Table nodes may be implemented in accordance with the present invention by realizing that instead of selecting from a single global table, the node has to also select from all of the local tables. This can be described as a mapping of the select operator over the collection consisting of all local tables and the global table. In practice, the set of tables to map over may be significantly limited based on the comparisons specified in the select expression associated with the table node. If, as in the example shown in FIG. 5, the select expression compares the value in the partitioning column with another OID, then the select can be restricted to the local table associated with the domain of the object.

However, in accordance with the invention, the scope of a query may be restricted by the user application program to a subset of the domains. In that case, the domains of the local tables need to be in that subset if the select is to consider the tuples stored therein. In other words, the domains will be restricted by computing the domains that need to be scanned based on both the set of domains that the user application program specified and the actual value of the select expression. The global domain may or may not be specified. For this purpose, a logical domain may be identified as a collection of logical and physical domain objects, thus allowing the user application programs to put a hierarchical structure on top of physical domains. A logical domain may also be treated as a data object and is defined by its OID, its name (charstring) and the set of domains (physical and logical) that it contains (such as by specifying the OIDs of those domains). All domain operations described above may also be performed on logical domains. However, when copying logical domains, the copying operation is split into two steps: first copying the logical domain and the objects contained in the logical domain and then copying the states of these objects. Hence, when copying logical domains, the OIDs of all objects contained in all domains being copied are replaced.

Nodes may be inserted and removed by determining the local table to insert or remove a particular tuple from based on the actual OID contained in the partitioning column of the tuple. In other words, to insert and remove a particular node, the local table containing that information must be found by specifying the domain OID and the tuple to be inserted or removed.

Update nodes may also be created in accordance with the present invention such that versioning is possible. An update node may be implemented by removing an old tuple and then inserting a new tuple. This may be done efficiently by directly replacing the elements of the tuple that need to be updated. However, when the partitioning column of a tuple is updated, the tuple may have to be moved into a different local table if the update causes the tuple to be included in the new domain.

As noted above, domains are implemented in accordance with the present invention by using OIDs to identify the domains. An OID includes a domain OID field and a domain offset (or object OID) field. The advantages of such a system are that the OID of the domain of an object may be easily computed by masking out any domain offset, and operations that involve renaming all of the objects in the domain, such as copying, become more efficient to implement since the local tables will store only the domain offset to refer to objects contained in the domain of the local table. This means that all objects in the domain are implicitly renamed by creating a new domain and copying the contents of the local tables. Generation of such an OID may be done in the routine for creating a new object by taking the domain of the object as an additional argument.

Another aspect of the implementation of domains in accordance with the present invention are the methods used for implementing local tables in the Storage Manager 412. Since many of the local tables associated with a domain can be quite small, containing only a few tuples, more specialized methods for implementing local tables may be needed. One method would be to linearize all local tables containing less than a certain number of tuples and storing the linearized tables into a single table of Storage Manager 412. One such table could be used per domain, or one such table could be used for the entire database. Then, when any of the local tables of a domain is needed, they could all be cached into cache memory 416, thus enabling quick and efficient access to the database information. However, as will be apparent to one skilled in the art, caching the local tables in their entirety has implications for locking of the tables during access.

Clustering in accordance with the present invention is thus based on domain OIDs rather than table OIDs as in the Iris system described in the background portion of the specification, and accordingly, information which should be stored together (such as information on a particular patient in a hospital) can be clustered. As a result, the relational Storage Manager 412 of the invention can lock the data that it needs to access without locking up entire pages of data and without the overhead which occurs when tuple level locking is attempted.

Accordingly, to implement domains in accordance with the invention, a method for implementing the state of objects is first provided. As described above, this may be defined by a collection of tuples. The query operators, in particular the select operator, must be modified so that they can deal with the modified storage representation (as domains). Again, the Iris system will be used as a reference.

In Iris, as noted above, the object state is given by a collection of (stored) functions. Generally, a stored function is implemented by mapping its arguments and results to the columns of a relational table. Multiple functions can be implemented in the same table by picking a clustering argument or result and sharing the column that it is mapped to between the functions that are clustered together. However, to implement the domain functionality, the tables of tuples in the database are split into local tables, one corresponding to each domain, and a global table corresponding to the global domain. To more clearly understand how this is accomplished in accordance with the present invention, an example will be described below with reference to FIG. 6.

Figure 6:
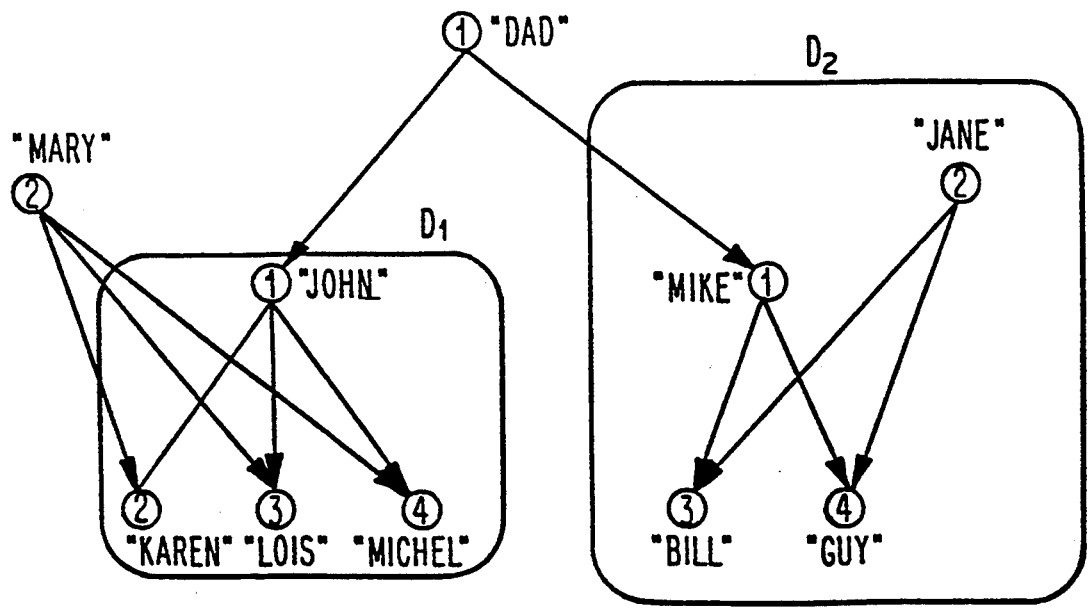
FIG. 6 illustrates an example of domain implemention in accordance with the techniques of the invention.

FIG. 6 illustrates data objects and their associated storage structures for a database management system in accordance with the invention. As shown, the data objects correspond to particular individuals, which for ease of description, have familial relationships with the other data objects. For example, Mike is a brother of John. John and Mary have children Karen, Lois and Michel, while Mike and Jane have children Bill and Guy. As shown in FIG. 6, two domains respectively labeled $D_1$ and $D_2$ are defined, where domain $D_1$ contains John and his children and $D_2$ contains Mike, his wife and his children. Mary and Dad are not in any domain and so by default are in the global domain. If it is assumed that a function "Children" has been defined so that corresponding tuples are stored with the parent object, then the extent of the Children function would be stored in three tables, one associated with the global domain and one associated with each domain $D_1$ and $D_2$.

In particular, a Name Table containing all the names in the database and a Children table containing the relationships among the members of the Name table are created in physical memory as shown in Tables 3 and 4:

TABLE 3

| NAME TABLE | |
|---|---|
| OID | NAME |
| 001 | "Dad" |
| 002 | "Mary" |
| 002:D2 | "Jane" |
| 001:D1 | "John" |
| 001:D2 | "Mike" |
| 002:D1 | "Karen" |
| 003:D1 | "Louise" |
| 004:D1 | "Michel" |
| 003:D2 | "Bill" |
| 004:D2 | "Guy" |

TABLE 4

| CHILDREN (RELATIONSHIP) TABLE | |
|---|---|
| OID | OID |
| 001 | 001:D1 |
| 001 | 001:D2 |
| 002 | 002:D1 |
| 002 | 003:D1 |
| 002 | 004:D1 |
| 001:D1 | 002:D1 |
| 001:D1 | 003:D1 |
| 001:D1 | 004:D1 |
| 001:D2 | 003:D2 |
| 001:D2 | 004:D2 |
| 002:D2 | 003:D2 |
| 002:D2 | 004:D2 |

Tables 3 and 4 are then partitioned into domains in accordance with the relationships shown in FIG. 6 as shown in the following Tables 5 and 6:

TABLE 5

| PARTITIONED NAME TABLE | | | | | |
|---|---|---|---|---|---|
| GLOBAL TABLE | | $D_1$ TABLE | | $D_2$ TABLE | |
| 001 | "Dad" | 001 | "John" | 001 | "Mike" |
| 002 | "Mary" | 002 | "Karen" | 002 | "Jane" |
| | | 003 | "Louise" | 003 | "Bill" |
| | | 004 | "Michel" | 004 | "Guy" |

TABLE 6

| PARTITIONED CHILDREN TABLE | | | | | |
|---|---|---|---|---|---|
| GLOBAL TABLE | | $D_1$ TABLE | | $D_2$ TABLE | |
| 001 | 001:D1 | 001:D1 | 002:D1 | 001:D2 | 003:D2 |
| 001 | 001:D2 | 001:D1 | 003:D1 | 001:D2 | 004:D2 |
| 002 | 002:D1 | 001:D1 | 004:D1 | 002:D2 | 003:D2 |
| 002 | 003:D1 | | | 002:D2 | 004:D2 |
| 002 | 004:D1 | | | | |

Thus, the input Name table and Children function table are decomposed into several local tables and a global table. These tables may then be clustered into domains as shown below such that all of the data for a particular domain is clustered. As shown in Tables 7 and 8, each row (tuple) of the domain tables (local tables) as reclustered includes the OID of the data object in the partitioned column. Those entries not shown remain in the global table.

TABLE 7

CLUSTERED DOMAIN $D_1$ TABLES

| OID | NAME | CHILDREN | |
|-----|------|----------|-----|
| 001 | "John" | 001 | 002 |
| 002 | "Karen" | 001 | 003 |
| 003 | "Louise" | 001 | 004 |
| 004 | "Michel" | | |

TABLE 8

CLUSTERED DOMAIN $D_2$ TABLES

| OID | NAME | CHILDREN | |
|-----|------|----------|-----|
| 001 | "Mike" | 001 | 003 |
| 002 | "Jane" | 001 | 004 |
| 003 | "Bill" | 002 | 003 |
| 004 | "Guy" | 002 | 004 |

If one wants to find the name of a particular person from these domains, the query engine of FIG. 4 must allow it to compute the proper result to a query. For example, if one wants to find the name of a particular person (e.g. select Name (:$p_1$), where it is assumed that $p_1$ is an interface variable that holds the OID of an object, in this case a person), the Iris query translator would transform this request into a relational query expression involving a select operator on the table that stores the extent of the Name function. However, since there is only one such table, the OID of the Name can be easily looked up and used for locating the table. When domains are used, however, this approach will have to be modified since the table is partitioned across domains. In other words, instead of selecting from a single table, the select will have to be applied to each of a collection of tables. The user should be able to specify in the user application program what domains the select should range over. To that end, the user may be allowed to specify a domain as part of the query expression using select syntax as in the above example, i.e., the above example could be changed to: select Name (:$p_1$) from $D_1$ for domain $D_1$. In this manner, the scope of the select statement can be restricted so that it can be applied to a user application program defined domain. However, when the user application program specifies a logical domain, the select will actually be applied to all of the physical domains that constitute the logical domain. In fact, if the user does not specify the domain as part of the query, it is preferred that a "world" domain be chosen as a default domain for the query, where the "world" domain is an application specific logical domain which at any one time contains all the domains checked out by the user application program.

As will be apparent to one skilled in the art, there are many benefits to using domains as a storage construct. For example, domains allow the database management system to build abstract operations onto objects stored therein without using pointers. The use of domains in accordance with the present invention also provides efficient caching of data across transactions by allowing user database application programs to access and update data in local storage on a per domain basis thereby optimizing performance. Data may also be explicitly locked under control of the user application program so as to reduce the probability of deadlock and abortion of transactions. Efficient control of partitioning of stored data using the user application program is also possible, which exploits the user application program's knowledge about the semantics of the relationships among the data objects in the database. Performance may also be improved by applying operations such as copying, versioning and the like to sets of logically related objects rather than single objects. The technique of the invention is also simple in that it simply uses OIDs to encode physical storage domains and relative OIDs to enable efficient copying of physical storage domains. The physical storage domains may also be restructured into logical domains such that local tables may be further clustered to improve efficiency.

In sum, when used with a database management system such as the Iris database system described in the background portion of the specification, the present invention allows user application programs to apply operations to sets of logically related objects. The objects that the user application progams apply operations to are cached on a per domain basis so that the requested tuples are not spread out on a disk. Moreover, by caching the data on a domain basis, the granularity of locks may be most efficiently controlled so as to increase the concurrency of different applications wishing to access common portions of the database. Domains further allow user application programs to structure data storage at a logical level, thus enabling database servers to cache data actually needed by the application and to optimize operations on sets of objects, thereby taking advantage of the specialized physical representations of objects in domains. Those skilled in the art will appreciate the further advantages made possible by the use of domains in accordance with the invention.

Although an exemplary embodiment of the invention has been described in detail above, those skilled in the art will readily appreciate that many additional modifications are possible in the exemplary embodiment without materially departing from the novel teachings and advantages of the invention. For example, the present invention may be used in medical database applications so that data for a single patient may be clustered together to thereby improve concurrency and efficiency of database accesses in the medical environment. Accordingly, all such modifications are intended to be included within the scope of this invention as defined in the following claims.

I claim:

1. A relational database management system for storing and manipulating data objects having object identities for use as arguments to database functions, comprising:

means for defining and manipulating tuples of data representing domain based relationships of said data objects;

a relational database having storage tables therein for storing said tuples; and storage management means for partitioning said storage tables, in accordance with domain based relationships of said data objects, into a plurality of local tables and for clustering said local tables into domains comprising collections of said local tables, each of said domains comprising a collection of local tables for storing a collection of data objects and the domain based relationships of said collection of data objects to other data objects in said relational database.

2. A system as in claim 1, wherein said means for defining and manipulating tuples comprises a user system having means for processing a user application program and a cache memory accessible by said user application program via said storage management means.

3. A system as in claim 2, wherein said storage management means caches tuples of a domain into said cache memory for controlling access by said user application program.

4. A system as in claim 1, wherein said relational database stores an input tuple in a local table corresponding to a domain in which all data objects referenced by data within the input tuple are contained.

5. A system as in claim 4, wherein said storage management means further partitions said storage tables into a global table which stores relationships between data objects in different domains.

6. A system as in claim 1, wherein said relational database stores an input tuple in a local table corresponding to a domain of a data object referenced by a particular data element of said input tuple.

7. A system as in claim 6, wherein said storage management means further partitions said storage tables into a global table which stores tuples not contained in said local tables.

8. A system as in claim 1, wherein a row of a local table stores a tuple, where each tuple comprises an ordered list of values including an object identity of a data object.

9. A system as in claim 1, wherein said storage management means assigns a domain object identity to each of said domains.

10. A system as in claim 9, wherein said storage management means identifies said data objects by composite object identities determined by combining said object identities of said data objects within a particular domain with said domain object identity of said particular domain.

11. A system as in claim 9, wherein said storage management means defines a logical domain which corresponds to a plurality of said domains by specifying an object identity of the logical domain, the name of the logical domain and a set of domains to be contained in the logical domain.

12. A method of partitioning data stored in a relational database in accordance with domain based relationships between data objects having object identities for use as arguments to database functions and of clustering the partitioned data into domains comprising collections of storage tables which allow tuples of application defined data stored therein to be manipulated by an application program, said method comprising the steps of:
    storing tuples of data representing domain based relationships of said data objects in at least one storage table of said relational database;
    partitioning said at least one storage table into a plurality of local tables in accordance with the domain based relationships of said data objects, each local table being associated with a domain comprising a collection of local tables for storing a collection of data objects and the domain based relationships of said collection of data objects to other data objects in said relational database; and
    clustering said local tables within said relational database into respective domains.

13. A method as in claim 12, wherein said storing step comprises the step of storing an input tuple in a local table corresponding to a domain in which all data objects referenced by data within the input tuple are contained.

14. A method as in claim 13, wherein said partitioning step comprises the step of partitioning said at least one storage table into a global table which stores relationships between data objects in different domains.

15. A method as in claim 12, wherein said storing step comprises the step of storing an input tuple in a local table corresponding to a domain of a data object referenced by a particular data element of said input tuple.

16. A method as in claim 15, wherein said partitioning step comprises the step of partitioning said at least one storage table into a global table which stores tuples not contained in said local tables.

17. A method as recited in claim 12, comprising the further step of assigning a domain object identity to each of said domains.

18. A method as recited in claim 17, wherein said assigning step comprises the step of identifying said data objects by composite object identities determined by combining said object identities of said data objects within a particular domain with said domain object identity of said particular domain.

19. A method as in claim 17, wherein said assigning step comprises the step of defining a logical domain which corresponds to a plurality of said domains by specifying an object identity of the logical domain, the name of the logical domain and a set of domains to be contained in the logical domain.

20. A method of manipulating data which is part of and represents related data objects stored in a relational database, comprising the steps of:
    storing tuples of data representing domain based relationships of said data objects in at least one storage table of said relational database;
    partitioning said at least one storage table into a plurality of local tables in accordance with the domain based relationships of said data objects, each table being associated with a domain comprising a collection of local tables for storing a collection of data objects and the domain based relationships of said collection of data objects to other data objects in said relational database;
    clustering said local tables within said relational database into respective domains;
    retrieving tuples from selected ones of said respective domains; and
    manipulating said retrieved tuples by applying object management operations to data objects within said selected domains.

21. A method as in claim 20, wherein said retrieving step comprises the step of caching tuples in a selected domain into a cache memory accessible by a user application program.

22. A method as in claim 21, wherein said retrieving step comprises the further step of controlling access to said tuples by said user application program on a per domain basis.

23. A method as in claim 20, comprising the further steps of assigning domain object identities to said domains and assigning object identities to said data objects, and wherein said object identities for said data objects within a first domain are composite object identities determined by combining said object identities of said data objects within said first domain with said domain object identity of said first domain.

24. A method as in claim 23, wherein said manipulating step comprises the steps of copying all tuples in said first domain to local tables of a second domain, and assigning said data objects within said second domain composite object identities determined by combining said object identities of said data objects within said first domain with said domain object identity of said second domain.

* * * * *